Dec. 28, 1954  D. P. MacMURRAY  2,697,979
DEWATERING AND COMPACTING PRESS
Filed June 10, 1952  2 Sheets-Sheet 1
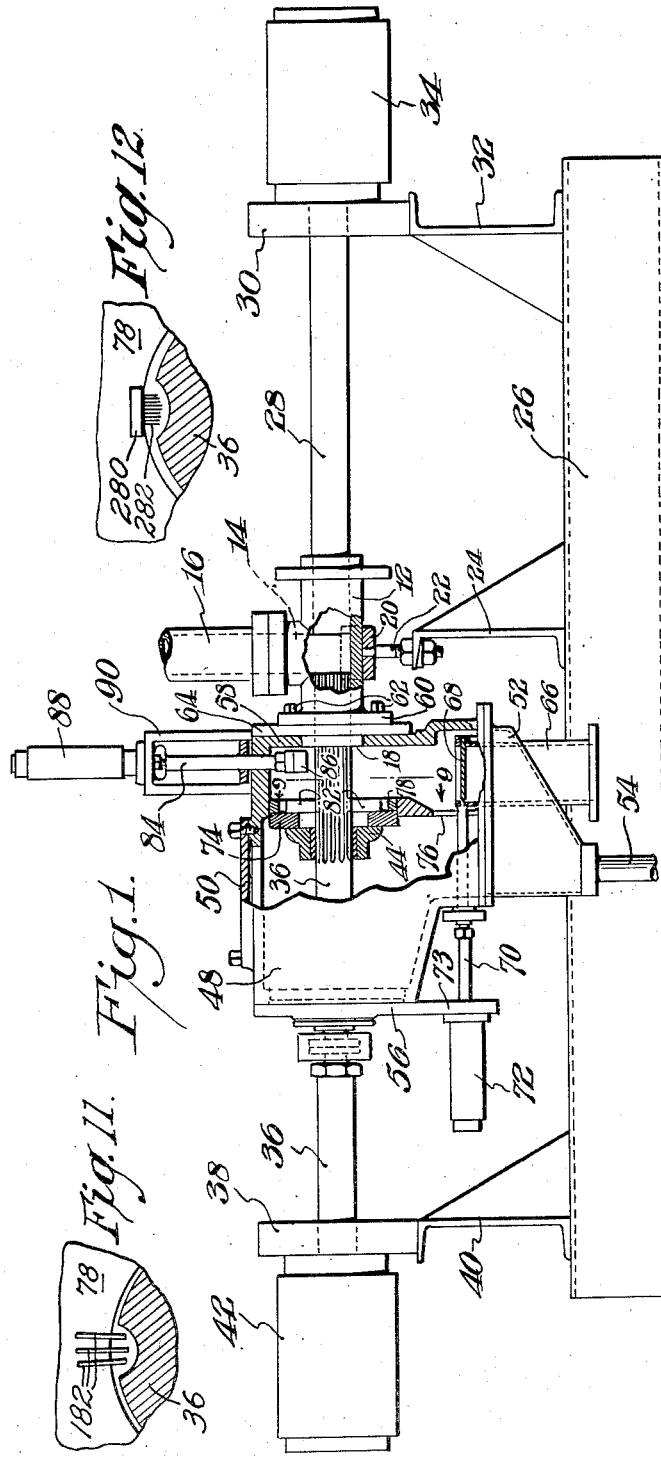
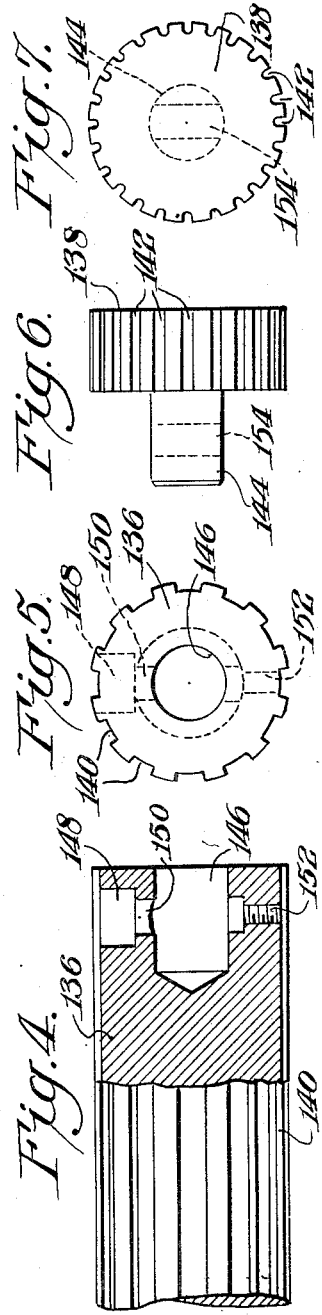
INVENTOR:
DANIEL P. MAC MURRAY
BY
ATTORNEY.

Dec. 28, 1954   D. P. MacMURRAY   2,697,979
DEWATERING AND COMPACTING PRESS
Filed June 10, 1952   2 Sheets-Sheet 2
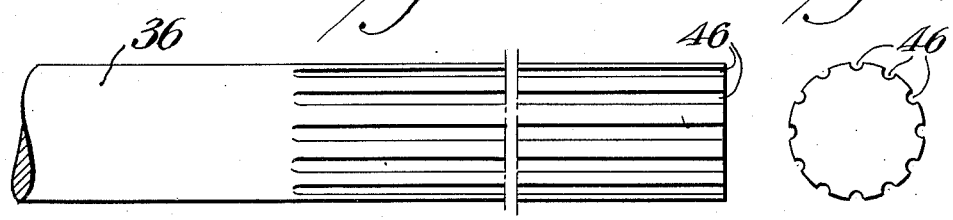
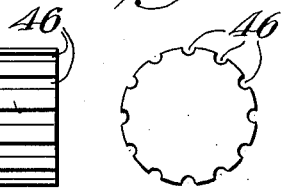
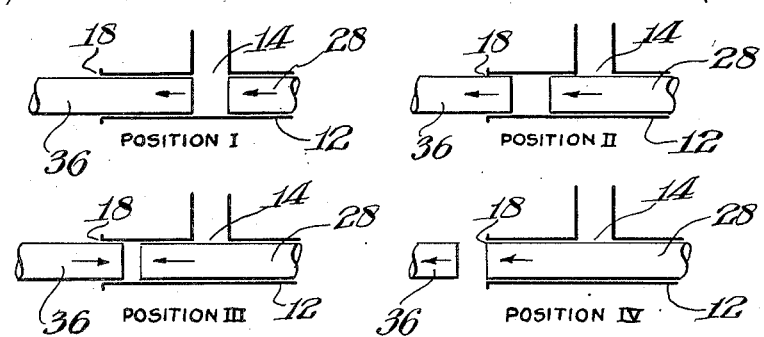
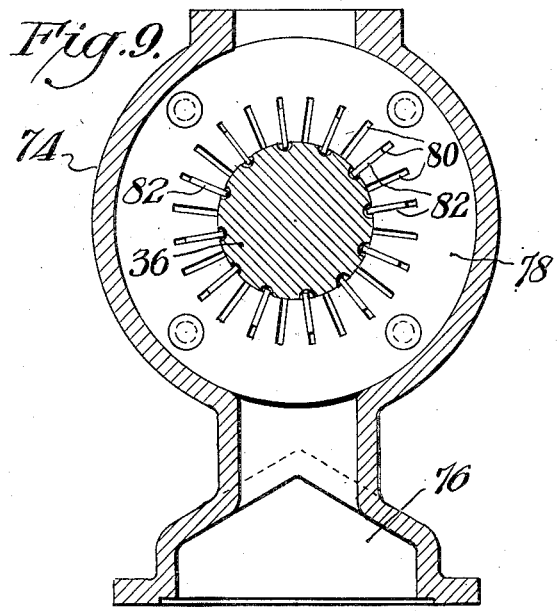
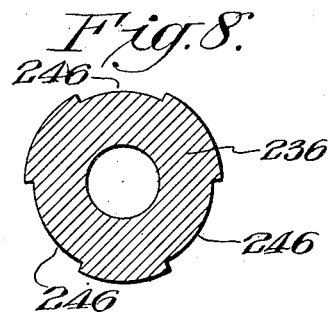
INVENTOR:
DANIEL P. MAC MURRAY
BY
Edwin C. Woodhouse
ATTORNEY.

United States Patent Office 2,697,979
Patented Dec. 28, 1954

2,697,979

DEWATERING AND COMPACTING PRESS

Daniel P. MacMurray, West Chester, Pa., assignor to E. I. du Pont de Nemours and Company, Wilmington, Del., a corporation of Delaware Application June 10, 1952, Serial No. 292,641

12 Claims. (Cl. 100—116)

This invention relates to a press for separating liquids from slurries and sludges and compacting the solid materials, and particularly to a press for dewatering and compacting aqueous lead sludges such as are formed in the manufacture of tetraethyl lead.

The problem arises in industry of separating liquids from slurries and sludges and at the same time compressing the solid material into a compact cake containing as little as possible of the original liquid. One example of such a system is a slurry of crystals of Glauber's salt, $Na_2SO_4.10H_2O$, in the saturated sodium sulfate solution with which it is in equilibrium. For certain purposes it is desired to remove substantially all of the liquid without air drying, which tends to dehydrate the crystals. Another example is silica gel in water. Here it is desired to dewater and compress at the same time. A third example is the aqueous slurry of finely-divided lead, obtained in working up the reaction product of sodium-lead alloy and ethyl chloride in the manufacture of tetraethyl lead. Here again it is desired to remove substantially all of the water and at the same time compress the lead into bricks or pellets which, unlike the finely-divided lead particles, are not readily oxidized.

Equipment ordinarily available is not suitable for accomplishing these objects. Thus, the ordinary pelleting equipment cannot be used when large quantities of water are present. The ordinary filter presses and other filtering devices do not compress the filter cake sufficiently for the present purposes, cannot withstand the high pressures required, and expose the material in porous form to the action of air.

Tetraethyl lead is manufactured by the reaction of an excess of ethyl chloride with an alloy of lead and sodium. After the reaction is completed, the excess ethyl chloride is distilled off from the reaction mass, the reaction mass is drowned in water and the tetraethyl lead is removed therefrom by steam distillation. During such process, the sodium of the alloy is mostly converted to sodium chloride, about 25% of the lead in the alloy is converted to tetraethyl lead, and the remainder of the lead is converted to metallic lead in finely-divided form suspended in the dilute solution of sodium chloride. Such suspension is then conveyed to a sludge pit where it is allowed to settle to form an upper layer of the aqueous solution of salt and a lower layer of aqueous sludge which comprises the lead mixed with from about 8% to about 20% by weight of the aqueous solution of the salt. The water layer is drawn off and the aqueous sludge is washed with water to remove most of the salt, then dried to remove most of the water, and the resulting lead is refined by melting in a reverberatory furnace at about 700° C. to about 900° C. This process of handling the lead sludge is expensive and hazardous throughout because of the presence of residual tetraethyl lead therein. It requires extensive facilities in the form of sludge pits, driers, furnaces and equipment for handling the sludge, and large amounts of heat. Recently, there has been developed a continuous process for carrying out the reaction and manufacturing tetraethyl lead, which further complicates the handling of the sludge and the recovery of the lead therefrom.

Denison and Whitman, in application Serial No. 232,852 filed June 21, 1951 disclose a process for dewatering aqueous lead sludges and compacting the lead by compressing such sludges between opposing solid pressure members under a pressure of from about 1000 to about 20,000 pounds per square inch and removing the water from the sludges during such compression. They thereby compress the lead particles into compacted form as sheets, strips, flakes or pellets free of the major proportion of the water, a pressure of at least about 1,000 p. s. i. being required to produce such results. They disclose that a wide variety of apparatus may be employed for carrying out such process, illustrated by three specific types. As one such type of apparatus suitable for use in such process, they illustrate in Figures 3 to 6 of their drawings and describe in some detail in their specification, an embodiment of the press of my invention, but do not claim such apparatus or the preferred mode of operating it.

It is an object of my invention to provide a press for simultaneously dewatering and compacting aqueous slurries and sludges and the like without exposing the solids to air. Another object is to provide a press of such character that can be operated rapidly in a substantially continuous manner. A further object is to provide a press that is relatively simple and strong in construction and simple in operation. A particular object is to provide a press of such character that is particularly adapted for dewatering and compacting aqueous lead sludges of the character obtained in the manufacture of tetraethyl lead. Further objects are to provide a novel article of manufacture and to advance the art. Still other objects will appear hereinafter.

The above and other objects are accomplished in accordance with my invention which comprises a horizontal elongated cylindrical die having a smooth bore of uniform diameter in which one end is the discharge end and which includes a charge-receiving zone spaced from the ends of the die, a charging inlet above the charge-receiving zone, and a compacting zone spaced between the charge-receiving zone and the discharge end of the die; a solid smooth-surfaced cylindrical pressing ram having a smooth flat end face, which pressing ram passes into the die through the rear end of the die, has a close sliding fit in the die and has a reciprocating stroke from the rear end of the charge-receiving zone to the discharge end of the die; means for reciprocating the pressing ram; a solid cylindrical anvil ram having a smooth flat end face and a plurality of small liquid conducting passages in the form of grooves in its cylindrical surface extending longitudinally from the end of the ram for a distance greater than the distance from the compacting zone to the discharge end of the die, the smallest dimension of each groove being in the range of from 0.005 to about 0.1 inch and the sum of the cross-sectional areas of such grooves being not materially greater than about 5% of the cross-sectional area of the ram, which anvil ram passes into the die through the discharge end of the die, has a close sliding fit in the die, and has a reciprocating stroke from the front end of the charge-receiving zone to a position outside of the discharge end of the die at a distance greater than the length of the the compacted solid mass produced in the compacting zone; and means for reciprocating the anvil ram.

Preferably, there will be a bearing for the anvil ram spaced from the discharge end of the die at a distance slightly greater than the distance between the end face of the ram and the discharge end of the die when the ram is at the outer end of its stroke. In other words, the bearing will be so placed that it will support and guide the anvil ram throughout its stroke, and will be near the end of the ram when the ram is at the outer end of its stroke. The grooves in the anvil ram will extend backward from the end of the ram for a distance at least equal to the distance from the charge-receiving zone to such bearing. In other words, the grooves in the ram will extend to the bearing when the end of the ram is at the end of its stroke farthest from the bearing. Also, preferably, a plurality of groove cleaning tools will be positioned around the anvil ram adjacent the end of the ram, usually beyond the end, when said ram is at the outer end of its stroke, the ends of said tools projecting into the grooves in the surface of the ram and having a sliding fit therein so that they ride in such grooves during the stroke of the ram until the end of the ram passes to a position in back of the tools, and preventing solids from building up in the grooves and clogging them. Thus, the cleaning tools will be positioned near the face of the bearing nearest the die and, most conveniently, may be supported on the bearing or its support.

It is particularly desirable to collect the expressed liquid and the compacted solids separately, to protect the solids from the atmosphere, and to protect personnel from the liquids and any fumes. This is especially important when aqueous lead sludges and slurries, obtained in the manufacture of tetraethyl lead, are treated in the press, because such sludges and slurries ordinarily contain small amounts of tetraethyl lead which is volatile and highly toxic. Accordingly, the die will discharge into an enlarged liquid-receiving chamber which encloses the discharge end of the die and the elements cooperating therewith, such as the aforementioned bearing for the anvil ram, the groove cleaning tools, and the like. Such chamber will ordinarily collect the expressed liquid and discharge it to equipment for further treatment.

A solids-receiving chute will have at least its upper end in the liquid-receiving chamber and positioned under the space immediately outside of the discharge end of the die, so as to receive the compacted solids produced by the press and to discharge such solids to storage means or to equipment for further treatment. Such chute will be provided with a cover which is normally maintained in closed position, but which is moved to uncover the end of the chute whenever the anvil ram is moved out of the die. Thereby, the cover prevents most of the liquid from entering the chute, but permits the compacted solids to drop into the chute when they are discharged from the die.

Ordinarily, the compacted solids, produced in the press, will drop from between the ends of the rams under their own weight when they are moved out of the discharge end of the die. Occasionally, however, the compacted solids tend to stick to the end face of one of the rams, particularly the end face of the anvil ram, or in the end of the die, even when the compacted solids are heavy lead pellets. Therefore, it is desirable to provide means for positively ejecting the compacted solids downwardly from between the ends of the rams when such compacted solids have been moved out of the discharge end of the die. Preferably, such means is in the form of a vertically reciprocating plunger which has its lower end normally positioned over the space immediately outside of the discharge end of the die, and means for reciprocating said plunger to move the lower end thereof downwardly between the ends of the rams and past the discharge end of the die whenever the compacted solids have been moved substantially completely out of the die. Thus, if the compacted solids do not quickly drop from between the ends of the rams under their own weight, the plunger will strike the compacted solids and knock them downwardly toward the uncovered end of the solids-receiving chute.

My press and its mode of operation will best be understood from a consideration of the accompanying drawings, which illustrate preferred embodiments of my invention, and the following detailed description thereof. In such drawings:

Figure 1 is a side view of the press with parts broken away and parts in section;

Figure 2 is a side view of the grooved end portion of a simple form of anvil ram;

Figure 3 is an end view of the ram of Figure 2;

Figure 4 is a side view of a portion of another form of anvil ram;

Figure 5 is an end view of the structure shown in Figure 4;

Figure 6 is a side view of a replaceable ram tip to be used with the structure of Figures 4 and 5;

Figure 7 is an end view of the ram tip of Figure 6;

Figure 8 is a cross-sectional view of an anvil ram, showing grooves of a different form;

Figure 9 is a view of the groove cleaning blades and supports therefor, taken at 9—9 of Figure 1;

Figure 10 is a diagrammatical illustration showing the position of the rams in the press during 4 stages of operation;

Figure 11 is a fragmentary view, partly in cross-section and on an enlarged scale, illustrating a plurality of thin groove-cleaning blades in each groove; and Figure 12 is a fragmentary view, partly in cross-section and on an enlarged scale, illustrating the use of a wire brush as a groove-cleaning tool for each groove.

Referring first to Figure 1, the press comprises a horizontal elongated tubular die 12 having a smooth bore of uniform diameter. Such die has a charging inlet 14 connected with a feed pipe 16 for the sludge or slurry to be treated, and a discharge end 18. The die has a charge-receiving zone directly under the charging inlet. The length of the charge-receiving zone may be widely varied, but, for practical purposes, will be equal to from about 1 to about 2 times its diameter, and preferably about equal to its diameter. Preferably, the diameter of the charging inlet is equal to the diameter of the charge-receiving zone, but may be somewhat smaller. The die, between the charge-receiving zone and the discharge end, is somewhat longer than the charge-receiving zone so as to provide a compacting zone of a length equal to the length of the charge-receiving zone and positioned wholly beyond the charge-receiving zone.

The die is supported on a V-block 20 mounted on the upper end of an adjusting screw 22 threaded into the upper end of a support 24. The support 24 is mounted on a bed plate 26.

A solid, smooth-surfaced cylindrical pressing ram 28 passes into the die through the rear end thereof, has a smooth flat end face, and has a close sliding fit in the bore of the die. The pressing ram, near its rear end, is supported in a bearing 30 on a bearing support 32 mounted on the bed plate 26. Such pressing ram is reciprocated in the die by means of a fluid pressure means 34, which usually is a hydraulic cylinder of conventional construction but may be a pneumatic cylinder. When the die is to receive a charge of sludge or slurry, the end face of the pressing ram will be at the right-hand end of the charge-receiving zone, forming the rear end wall of such zone, and will have a reciprocating stroke from such end of the charge-receiving zone to the discharge end of the die.

A solid cylindrical anvil ram 36, having a smooth flat end face, passes into the die through the discharge end of the die and has a close sliding fit in the bore of the die. Near its rear end, the anvil ram is supported in a bearing 38 on a bearing support 40 mounted on the bed plate 26. Such anvil ram is reciprocated by means of a fluid pressure means 42, similar to 34. When the die is to receive a charge of sludge or slurry, the end face of the anvil ram will be at the left-hand end of the charge-receiving zone, forming the front end wall of such zone. The ram will have a reciprocating stroke from such end of the charge-receiving zone to a position outside of the discharge end of the die such that its end face is spaced from the die at a distance greater than the length of the compacted mass produced in the compacting zone, all as will be explained in more detail in the description of the operation of the press. The anvil ram is also supported in and guided by a second bearing 44 which is spaced from the discharge end of the die at a distance slightly greater than the distance between the end face of the ram and the discharge end of the die when the ram is at the end of its stroke, so as to support the ram throughout its stroke and ensure its entry into the die.

Referring particularly to Figures 2 and 3, the anvil ram 36 is provided with a plurality of small liquid-conducting passages 46 which are in the form of grooves in its cylindrical surface and which extend longitudinally from the end of the ram for a distance greater than the distance from the compacting zone to the discharge end of the die, preferably for a distance at least equal to the distance from the charge-receiving zone of the die to the bearing 44. The smallest dimension, depth or width, of each groove should be in the range of from 0.005 to about 0.1 inch. The sum of the cross-sectional areas of the grooves preferably should not be materially greater than 5% of the cross-sectional area of the ram, and most desirably should be less than 5%. The cross-sectional area of the ram is calculated from the diameter of the circle described by the outer surface of the portions between the grooves. Also, the depth of the grooves should not exceed about 10% of the radius of the ram. Within such limits, the number, size and form of the grooves may be widely varied. In the form shown in Figures 2 and 3, the ram had a diameter of substantially 3 inches and the grooves were semi-circular about 1/16 inch wide and about 1/32 inch deep, 12 grooves being illustrated but there being 32 such grooves in the ram actually used.

Other suitable forms of anvil ram are illustrated in Figures 4 to 7 and 8. Figures 4 to 7 illustrate an anvil ram provided with a detachable tip 138. As shown, the main portion 136 of the ram is provided with 12 wide shallow grooves 140 which, in a ram having a diameter of 3 inches, will be about ½ inch wide and about ⅛ inch deep. The tip 138 has grooves 142 whose smallest dimension, depth or width, is in the range of from 0.005 to about 0.1 inch and whose other dimension, depth or width does not exceed the corresponding dimension, depth or width as the case may be, of the grooves 140. As shown, there are 24 grooves 142, pairs of which register with and feed into single grooves 140. However, the number of grooves 142 may be equal to the number of grooves 140 and so spaced that each groove 142 registers with and feeds into a separate groove 140, thus forming continuous grooves similar to grooves 46 in Figure 2. The number of grooves 142 may be several times the number of grooves 140, each registering with and feeding into a groove 140 and there being at least 1 groove 142 registering with each groove 140 as in the modification of Figures 4 to 7. Usually, there will be provided sets of tips 138 having various numbers, sizes and shapes of grooves, so that the effective numbers, sizes and shapes of grooves in the end of the anvil ram may be varied as desired by employing the appropriate tip.

The tip 138 is provided with a shank 144 which fits into a socket 146 in the end of the main portion 136 of the ram. The portion 136 is provided with a socket 148, smooth bore 150 and threaded bore 152 to receive a shoulder screw, not shown. The bore 150 extends across the socket 146, and the shank 144 of the tip 138 is provided with a corresponding smooth bore 154 which registers with bore 150, whereby the tip will be firmly secured in position at the end of the ram by the shoulder screw. Most conveniently, the head or grooved portion of the tips will be from about 0.75 to about 1.25 inch long.

While the tips 138 preferably are detachable, they may be permanently attached to the end of the ram. Also, some of the advantages of the tips may be obtained by forming an anvil ram without a separate tip but with small short grooves at the end, feeding into wider long grooves extending rearwardly therefrom, preferably having 2 or more of the small grooves feeding into a single wide groove as in the modification of Figures 4 to 7.

Figure 8 illustrates an anvil ram 236 provided with only 3 very wide grooves 246. Such grooves may extend from the end face in the ram as in Figures 2 and 3, in which case, they should have a depth of from 0.005 to about 0.1 inch. Preferably, however, such wide grooves 246 will be in the main portion of a ram provided with a tip, similar to the structure shown in Figures 4 to 7, inclusive. In the latter case, the grooves 246 may have a depth considerably greater than 0.1 inch, provided that their depth is not greater than about 10% of the radius of the ram and provided further that the sum of the cross-sectional areas of the 3 grooves does not greatly exceed 5% of the cross-sectional area of the ram.

The liquid-conducting grooves in the cylindrical surface of the anvil ram constitute an important feature of my invention. Rams were constructed with liquid-receiving chambers or passages in back of their ends and with their ends in the form of filters made of porous sintered metal discs and of perforated metal plates in which the perforations had diameters of 1/32 inch and 1/64 inch, respectively, backed up by rib supports. In each case, the pores and perforations rapidly became clogged and no practicable means could be devised for removing the clogging materials.

Referring back to Figure 1, the press die 12 discharges into an enlarged, closed liquid-receiving chamber 48 which encloses the discharge end 18 of the die, the bearing 44 and the other elements that cooperate with the discharge end of the die. Such chamber is closed at the top by a removable cover 50 and has a sloping bottom wall 52 which directs liquid, collected by the chamber, to a discharge pipe 54. The rear end wall 56 of the chamber 48 is positioned rearwardly of the bearing 44 by a distance at least equal to the length of the grooves in the anvil ram, so that the ends of such grooves are not brought outside of the chamber where liquid could drain from them. The front end wall 58 of the chamber 48 fits around the discharge end 18 of the die and is secured to a flange 60 of the die by nuts and bolts 62. A gasket 64 is placed between the wall 58 and the flange 60.

A solids-receiving chute 66 extends up through the bottom wall of the chamber 48 and has its upper end positioned under the space immediately outside of the discharge end of the die so that it can receive the compacted solids dropping from the discharge end of the die. The upper end of the chute 66 is normally closed by a sliding cover or gate 68 which is reciprocated periodically by means of a rod 70 and a fluid pressure means 72, such as a hydraulic cylinder or a pneumatic cylinder. The fluid pressure means 72, as shown, is supported on a depending portion 73 of the end wall 56. The reciprocation of the cover is timed with the operation of the rams so that the chute is closed by the cover while the anvil ram is in the die, but is uncovered when the anvil ram is moved out of the die sufficiently to permit the compacted solids to drop down from between the rams.

Referring particularly to Figures 1 and 9, the bearing 44 is supported in the chamber 48 by a bearing support 74 which in turn is secured to the walls of the chamber 48. Such bearing support is provided with a large opening 76 through which the rod 70 extends and operates. The bearing support 74 also carries a groove-cleaning tool holder 78 which is provided with a plurality of radial slots 80 in its inner edge. Groove-cleaning tools 82 are secured in the slots 80 by any conventional means, such as solder. As shown, the groove-cleaning tools are in the form of thin blades, the end of each of which projects into a groove in the anvil ram 36 and has a sliding fit therein. The number of the groove-cleaning tools are equal to the number of grooves in the anvil ram or, when the ram has a detachable tip as in Figures 4 to 7, will be equal to the number of grooves in the tip and of such form as to have a sliding fit in the grooves in the tip. Thus, such groove-cleaning tools are positioned around the anvil ram adjacent the end of the ram when said ram is at the outer end of its stroke. Preferably, the groove-cleaning tools are positioned over the solids-receiving chute and the stroke of the anvil ram is such that, at the outer end of its stroke, the end of the ram passes to a position in back of at least the front edge of the groove-cleaning tools; whereby any solids, removed from the grooves by the groove-cleaning tools, will drop into the chute 66.

It will be understood that the form of the groove-cleaning tools and the mounting and the support therefor may be widely varied. There may be a plurality of thinner blades 182 for each groove as shown in Figure 11, the blades being secured in the holder 78 in the same manner as blades 82. The groove-cleaning tools may be in the form of wire bristles 282 of one or a plurality of wire brushes 280, in which case, there will usually be more than one bristle (groove-cleaning tool) in each groove as shown in Figure 12, the brushes being secured in the holder 78 by any conventional means such as solder. Such wire brushes have been used satisfactorily, but are less efficient than the blades. When the groove-cleaning tools are in the form of blades or equivalent substantially rigid members, it is essential that the grooves be of a length to extend back approximately to the bearing 44 when the anvil ram is at the inner end of its stroke in the die, so as to avoid damage to the tools or to the ram and to prevent the tools from interfering with the desired motion of the ram.

A vertically reciprocating plunger 84 has an enlarged lower end 86 normally positioned over the space immediately outside of the discharge end of the die. Such plunger is reciprocated by a fluid pressure means 88, such as a hydraulic or pneumatic cylinder, supported on a frame 90 which, in turn, is supported by the top wall of the chamber 48. The plunger 84 will be reciprocated periodically when the anvil ram 36 is moved out of the die and out of the vertical path of the end of the plunger, and hence in a position to permit the compacted solids to drop down into the chute 66. By such reciprocation, the end of the plunger is moved down past the discharge end of the die and between the ends of the rams so as to strike the compacted solids whenever they tend to stick to the end of either of the rams or in the discharge end of the die, and to knock said compacted solids downward toward the chute 66. To ensure that the compacted solids are knocked down in a vertical direction, the lower end face of the plunger desirably is made concave, preferably having a radius of curvature corresponding to that of the anvil ram and parallel thereto.

The structure, shown in the drawings and hereinbefore described in detail in connection with such drawings, is particularly designed and adapted for use in the dewatering and compacting of aqueous lead sludges and slurries of the character obtained in the manufacture of tetraethyl lead. Such sludges and slurries are composed essentially of a mixture of finely-divided lead and about 3% or more by weight of water. Usually, the water constitutes from about 3% to about 20% by weight of the sludge or slurry, preferably from about 8% to about 20%. The water may contain in solution the salt produced in the reaction, but usually contains less than 10% by weight of salt and may be free of salt. The lead is ordinarily in the form of particles having a diameter of less than 0.1 inch, with some as small or smaller than 10 microns (0.0004 inch), and occasionally with agglomerated pieces up to about 1 inch in diameter. Such particles of lead usually are partially oxidized so that they are coated with lead oxide, the lead oxide varying from less than 1% to about 20% by weight of the lead, usually from about 2% to about 10%. The sludges and slurries may contain from none to all of the tetraethyl lead formed in the reaction, but usually will contain only a small residual amount thereof which cannot be practically removed by steam distillation.

In order to compress the lead particles, in such sludges and slurries, into dense compacted pellets and to expel the liquid therefrom to a satisfactory extent, it is necessary to subject the sludges and slurries to pressures of 1,000 p. s. i. or more, desirably from about 1,900 p. s. i. to about 20,000 p. s. i., preferably from about 1,900 p. s. i. to about 10,000 p. s. i., and most usually from about 5,000 p. s. i. to about 7,000 p. s. i.

Accordingly, the operation of the structure of the drawings will now be described in some detail as used in the treatment of such aqueous lead sludges and slurries, particular reference being made to Figures 1 and 10 of the drawings.

The operation starts with the various moving parts in the position shown in Figure 1 and the ends of the rams 28 and 36 at opposite sides of the inlet 14, as shown in Position I of Figure 10, the space between the ends of the rams constituting the charge-receiving zone. The pipe 16 is connected with a continuous supply of aqueous lead sludge or slurry obtained in the manufacture of tetraethyl lead. Such sludge or slurry quickly flows into and fills the charge-receiving zone.

Thereupon, the rams 36 and 28 are moved, simultaneously and at substantially the same speed, to the left until the end of the pressing ram 28 has passed beyond the inlet 14 and the charge of sludge or slurry is in the compacting zone between the inlet 14 and the discharge end 18 of the die, Position II of Figure 10. Thus, the charge is not subjected to any substantial compression while it is under the inlet 14, and the pressing is confined to a compacting zone which is wholly beyond and independent of the charge-receiving zone, whereby there is no tendency to force part of the charge back through the inlet 14.

At this point, the motion of the anvil ram 36 is stopped, or reversed to a small extent, while the motion of the pressing ram is continued, as shown in Position III of Figure 10, until the charge is placed under a pressure of from about 1,000 to about 20,000 pounds per square inch. Thereby the charge is compressed and the particles of lead are pressed together into a dense compacted pellet, while the water or aqueous solution of salt is expelled from the charge. Most of the water or aqueous solution passes through the grooves in the anvil ram, out of the discharge end of the die, into the liquid-receiving chamber 48 and out through the pipe 54, but is prevented from entering the chute 66 by the cover 68. Little or no solid particles pass through the grooves in the anvil ram with the water, but substantially all are retained between the ends of the rams, even though the majority of such particles are of a size to freely pass through such grooves and the pressures are from about 1,000 to about 20,000 pounds per square inch. However, there is a tendency for a small amount of such particles to enter the ends of the grooves, and such particles, if allowed to accumulate, would clog the grooves.

When the lead particles have been compacted to the desired extent, that is, when the desired pressure has been attained, the movement of the anvil ram 36 to the left is resumed, but at a higher rate of speed than the pressing ram, until the end of the anvil ram is moved out of the die at a distance greater than the length of the compacted pellet produced in the compacting zone and the pressing ram is moved to the discharge end of the die where it stops, as shown by Position IV of Figure 10. Simultaneously with such last movement of the anvil ram, the rod 70 is reciprocated to move the cover 68 of the chute 66 to the left, so that the upper end of the chute 66 is uncovered by the time that the end of the anvil ram and the compacted pellet are moved out of the discharge end of the die and into a position where the pellet can drop from between the rams into the chute. By moving the anvil ram more rapidly than the pressing ram in this stage of the operation, the pressure on the compacted pellet is released and the space between the ends of the rams is increased to where it is greater than the length of the pellet by the time that the pellet is moved out of the discharge end of the die, whereby the pellet is free to drop by gravity from between the ends of the rams.

When the compacted pellet has been moved out of the discharge end of the die, i. e. when the rams have reached Position IV of Figure 10, the plunger 84 is reciprocated downwardly so that the end 86 of the plunger is moved past the discharge end of the die and between the ends of the rams. Thereby, the end of the plunger will strike the pellet, if such pellet should stick to the end of either ram or should stick in the discharge end of the die, and will knock such pellet down into the chute 66.

The plunger will be returned immediately to the position shown in Figure 1, out of the path of the anvil ram. The rams will be returned to their original position, Position I of Figure 10, to receive a new charge of the sludge or slurry. Simultaneously, the cover 68 is moved to close the end of the chute 66. The operation will then be repeated.

During the operation, the groove-cleaning tools 82 ride in the grooves of the anvil ram. Preferably, the rearward stroke of the anvil ram is such that its end passes wholly or partially through the groove-cleaning tool assembly, most desirably to a position back of the groove-cleaning tools, so that at least the front edges of the tools will pass out of the ends of the grooves. Thereby, the groove-cleaning tools remove any solids which may incidentally enter the grooves, preventing any gradual accumulation of solids which might tend to clog the grooves. Also, because of the position of the groove-cleaning tools over the chute 66, such solids fall into the chute 66 and are separated from the liquid which passes through the drain pipe 54.

Most conveniently, the various moving parts are operated automatically in the indicated time relationship. The operation of the press is readily carried out at a rapid rate, sufficiently so that it is particularly adapted for commercial use with continuously produced aqueous lead sludges and slurries. The pressing time may vary from about 1 to about 30 seconds and each complete cycle of operation may be from about 11 to about 45 seconds, depending upon the pressure to be attained and the size of the charge. Usually, the pressing time will be from about 5 to about 15 seconds and the complete cycle will take from about 15 to about 30 seconds.

In order to more clearly illustrate my invention and the advantageous results to be obtained thereby, the following examples are given, in which the proportions are by weight except where otherwise stated:

*Example I*

A press of the character shown in the drawings was employed in which the bore of the die, the charging inlet 14, and the supply pipe 16 each had a diameter of 3 inches, the charge-receiving zone was 3 inches long, and the anvil ram had 32 liquid conducting grooves, each of which was semi-circular about $\frac{1}{16}$ inch wide and about $\frac{1}{32}$ inch deep. The material treated was an aqueous lead sludge which contained about 9.5% water and about 1% NaCl, in which the lead particles all had a diameter of less than 0.1 inch, and which was at a temperature of 20° C. to 30° C. The pressure in the compacting zone reached about 6600 p. s. i., the pressing time was about 10 seconds, and the time of each cycle was about 20 seconds. Compacted lead pellets were produced at the rate of 3 per minute. Each pellet was about 3 inches in diameter, about 1.25 inches long, contained about 1.0% water, had a density of about 9.1 gms./cc. and weighed about 3 pounds.

*Example II*

The press of Example I was used with an aqueous lead sludge which contained about 20.6% water and less than 0.1% NaCl, in which the lead particles all had a diameter of less than 0.1 inch, and which was at a temperature of 40° C. to 50° C. The pressure in the compacting zone reached about 5,250 p. s. i., the pressing time was about 5 seconds, and the time of each cycle was about 15 seconds. Compacted lead pellets were produced at the rate of 4 per minute. Each pellet was about 3 inches in diameter, about 1.5 to about 2.0 inches long, contained about 1.85% water, had a density of about 7.47 gms./cc. and weighed about 3 pounds.

Similar results were obtained with similar aqueous lead sludges which contained lumps of lead with diameters ranging from about ½ inch to about 1 inch.

For larger scale commercial operation, it will be convenient to use a press in which the charge-receiving zone is about 12 inches in diameter and about 12 inches long, the bore of the die, the charging inlet 14 and the feed pipe each preferably having a diameter of 12 inches. In order to produce pellets of a character similar to those of the preceding examples in such larger press, the pressing time will average about 13 seconds, the time of each cycle will average about 26 seconds, and the production will be at the rate of about 2.3 pellets per minute. Each pellet will be about 12 inches in diameter, an average of about 6 inches long and will weigh from about 175 to about 200 pounds.

The various parts of the press will be constructed of any suitable material which will withstand the conditions. Steel is usually satisfactory. The parts exposed to the liquids may advantageously be made of corrosion-resistant types of steel or may be coated or lined with more corrosion-resistant metals.

It will be understood that the detailed structure, shown in the drawings and described in the specification, and the preceding examples, are given for illustrative purposes solely and that many variations can be made in the details of construction and the pressures employed, within the limits set forth, without departing from the spirit or scope of my invention. For example, the plunger and the groove-cleaning tools may be eliminated as in the embodiment disclosed in the application of Denison and Whitman, the form of the grooves, of the groove-cleaning tools and of the supporting means for such tools may be varied, and the form of the liquid-receiving chamber, of the solids-receiving chute and of the cover for such chute may be varied. Accordingly, I intend to cover my invention both broadly and specifically, as in the appended claims.

From all of the above, it will be apparent that I have provided a novel apparatus which is strong and relatively simple in construction, which operates in a novel manner, which is simple and efficient in operation, and which is particularly adapted to dewater continuously produced aqueous lead sludges and slurries obtained in the manufacture of tetraethyl lead and to compress the lead particles into dense compacted lead pellets without exposing such particles to the atmosphere and without exposing personnel to hazardous liquids and fumes. Accordingly, my invention constitutes a valuable advance in and contribution to the art.

I claim:

1. A press for dewatering and compacting aqueous slurries and sludges which comprises a horizontal elongated tubular die having a smooth bore of uniform diameter in which one end is the discharge end and which includes a charge-receiving zone spaced from the ends of the die, a charging inlet above the charge-receiving zone, and a compacting zone between the charge-receiving zone and the discharge end of the die; a solid smooth-surfaced cylindrical pressing ram having a smooth flat end face, which pressing ram passes into the die through the rear end of the die, has a close sliding fit in the die and has a reciprocating stroke from the rear end of the charge-receiving zone to the discharge end of the die; means for reciprocating the pressing ram; a solid cylindrical anvil ram having a smooth flat end face and a plurality of small liquid-conducting passages in the form of grooves in its cylindrical surface extending longitudinally from the end of the ram for a distance greater than the distance from the compacting zone to the discharge end of the die, the smallest dimension of each groove being in the range of from 0.005 to about 0.1 inch and the sum of the cross-sectional areas of such grooves being no greater than about 5% of the cross-sectional area of the ram, which anvil ram passes into the die through the discharge end of the die, has a close sliding fit in the die, and has a reciprocating stroke from the front end of the charge-receiving zone to a position outside of the discharge end of the die at a distance greater than the length of the compacted solid mass produced in the compacting zone; and means for reciprocating the anvil ram.

2. A press for dewatering and compacting aqueous slurries and sludges which comprises a horizontal elongated tubular die having a smooth bore of uniform diameter in which one end is the discharge end and which includes a charge-receiving zone spaced from the ends of the die, a charging inlet above the charge-receiving zone, and a compacting zone between the charge-receiving zone and the discharge end of the die; a solid smooth-surfaced cylindrical pressing ram having a smooth flat end face, which pressing ram passes into the die through the rear end of the die, has a close sliding fit in the die and has a reciprocating stroke from the rear end of the charge-receiving zone to the discharge end of the die; means for reciprocating the pressing ram; a solid cylindrical anvil ram having a smooth flat end face, which anvil ram passes into the die through the discharge end of the die, has a close sliding fit in the die, and has a reciprocating stroke from the front end of the charge-receiving zone to a position outside of the discharge end of the die at a distance greater than the length of the compacted solid mass produced in the compacting zone, a bearing for said anvil ram spaced from the discharge end of the die at a distance slightly greater than the distance between the end face of the ram and the discharge end of the die when the ram is at the outer end of its stroke, said anvil ram having a plurality of small liquid-conducting passages in the form of grooves in its cylindrical surface extending longitudinally from the end of the ram for a distance at least equal to the distance from the compacting zone to the aforesaid bearing for the ram, the smallest dimension of each groove being in the range of from 0.005 to about 0.1 inch and the sum of the cross-sectional areas of such grooves being no greater than 5% of the cross-sectional area of the ram; and means for reciprocating the anvil ram.

3. A press for dewatering and compacting aqueous slurries and sludges which comprises a horizontal elongated tubular die having a smooth bore of uniform diameter in which one end is the discharge end and which includes a charge-receiving zone spaced from the ends of the die, a charging inlet above the charge-receiving zone, and a compacting zone between the charge-receiving zone and the discharge end of the die; a solid smooth-surfaced cylindrical pressing ram having a smooth flat end face, which pressing ram passes into the die through the rear end of the die, has a close sliding fit in the die and has a reciprocating stroke from the rear end of the charge-receiving zone to the discharge end of the die; means for reciprocating the pressing ram; a solid cylindrical anvil ram having a smooth flat end face and a plurality of small liquid-conducting passages in the form of grooves in its cylindrical surface extending longitudinally from the end of the ram for a distance greater than the distance from the compacting zone to the discharge end of the die, the smallest dimension of each groove being in the range of from 0.005 to about 0.1 inch and the sum of the cross-sectional areas of such grooves being no greater than 5% of the cross-sectional area of the ram, which anvil ram passes into the die through the discharge end of the die, has a close sliding fit in the die, and has a reciprocating stroke from the front end of the charge-receiving zone to a position outside of the discharge end of the die at a distance greater than the length of the compacted solid mass produced in the compacting zone; means for reciprocating the anvil ram; a solids-receiving chute having its upper end positioned under the space immediately outside of the discharge end of the die, a cover for the upper end of said chute normally maintained in closed position, means moving said cover to uncover the upper end of said chute whenever the anvil ram is moved out of the die; and an enlarged liquid-receiving chamber enclosing the discharge end of the die and the upper end of the solids-receiving chute.

4. A press for dewatering and compacting aqueous slurries and sludges which comprises a horizontal elongated tubular die having a smooth bore of uniform diameter in which one end is the discharge end and which includes a charge-receiving zone spaced from the ends of the die, a charging inlet above the charge-receiving zone, and a compacting zone between the charge-receiving zone and the discharge end of the die; a solid smooth-surfaced cylindrical pressing ram having a smooth flat end face, which pressing ram passes into the die through the rear end of the die, has a close sliding fit in the die and has a reciprocating stroke from the rear end of the charge-receiving zone to the discharge end of the die; means for reciprocating the pressing ram; a solid cylindrical anvil ram having a smooth flat end face, which anvil ram passes into the die through the discharge end of the die, has a close sliding fit in the die, and has a reciprocating stroke from the front end of the charge-receiving zone to a position outside of the discharge end of the die at a distance greater than the length of the compacted solid mass produced in the compacting zone, a bearing for said anvil ram spaced from the discharge end of the die at a distance slightly greater than the distance between the end face of the ram and the discharge end of the die when the ram is at the outer end of its stroke, said anvil ram having a plurality of small liquid-conducting passages in the form of grooves in its cylindrical surface extending longitudinally from the end of the ram for a distance at least equal to the distance from the compacting zone to the aforesaid bearing for the ram, the smallest dimension of each groove being in the range of from 0.005 to about 0.1 inch and the sum of the cross-sectional areas of such grooves being no greater than 5% of the cross-sectional area of the ram; means for reciprocating the anvil ram; a solids-receiving chute having its upper end positioned under the space immediately outside of the discharge end of the die, a cover for the upper end of said chute normally maintained in closed position, and means moving said cover to uncover the upper end of said chute whenever the anvil ram is moved out of the die; and an enlarged liquid-receiving chamber enclosing the discharge end of the die, the upper end of the solids-receiving chute and the aforesaid bearing for the anvil ram.

5. A press for dewatering and compacting aqueous slurries and sludges which comprises a horizontal elongated tubular die having a smooth bore of uniform diameter in which one end is the discharge end and which includes a charge-receiving zone spaced from the ends of the die, a charging inlet above the charge-receiving zone, and a compacting zone between the charge-receiving zone and the discharge end of the die; a solid smooth-surfaced cylindrical pressing ram having a smooth flat end face, which pressing ram passes into the die through the rear end of the die, has a close sliding fit in the die and has a reciprocating stroke from the rear end of the charge-receiving zone to the discharge end of the die; means for reciprocating the pressing ram; a solid cylindrical anvil ram having a smooth flat end face and a plurality of small liquid-conducting passages in the form of grooves in its cylindrical surface extending longitudinally from the end of the ram for a distance greater than the distance from the compacting zone to the discharge end of the die, the smallest dimension of each groove being in the range of from 0.005 to about 0.1 inch and the sum of the cross-sectional areas of such grooves being no greater than 5% of the cross-sectional area of the ram, which anvil ram passes into the die through the discharge end of the die, has a close sliding fit in the die, and has a reciprocating stroke from the front end of the charge-receiving zone to a position outside of the discharge end of the die at a distance greater than the length of the compacted solid mass produced in the compacting zone; and means for reciprocating the anvil ram; a vertically reciprocating plunger having its lower end normally positioned over the space immediately outside of the discharge end of the die, and means reciprocating said plunger to move the lower end of said plunger downwardly past the discharge end of the die whenever compacted solids have been moved substantially completely out of such die.

6. A press for dewatering and compacting aqueous slurries and sludges which comprises a horizontal elongated tubular die having a smooth bore of uniform diameter in which one end is the discharge end and which includes a charge-receiving zone spaced from the ends of the die, a charging inlet above the charge-receiving zone, and a compacting zone between the charge-receiving zone and the discharge end of the die; a solid smooth-surfaced cylindrical pressing ram having a smooth flat end face, which pressing ram passes into the die through the rear end of the die, has a close sliding fit in the die and has a reciprocating stroke from the rear end of the charge-receiving zone to the discharge end of the die; means for reciprocating the pressing ram; a solid cylindrical anvil ram having a smooth flat end face and a plurality of small liquid-conducting passages in the form of grooves in its cylindrical surface extending longitudinally from the end of the ram for a distance greater than the distance from the compacting zone to the discharge end of the die, the smallest dimension of each groove being in the range of from 0.005 to about 0.1 inch and the sum of the cross-sectional areas of such grooves being no greater than 5% of the cross-sectional area of the ram, which anvil ram passes into the die through the discharge end of the die, has a close sliding fit in the die, and has a reciprocating stroke from the front end of the charge-receiving zone to a position outside of the discharge end of the die at a distance greater than the length of the compacted solid mass produced in the compacting zone; and means for reciprocating the anvil ram; a vertically reciprocating plunger having its lower end normally positioned over the space immediately outside of the discharge end of the die, and means reciprocating said plunger to move the lower end of said plunger downwardly past the discharge end of the die whenever compacted solids have been moved substantially completely out of such die; a solids-receiving chute having its upper end positioned under the space immediately outside of the discharge end of the die, a cover for the upper end of said chute normally maintained in closed position, means moving said cover to uncover the upper end of said chute whenever the anvil ram is moved out of the die; and an enlarged liquid-receiving chamber enclosing the discharge end of the die, the upper end of the solids-receiving chute and the lower end of the plunger.

7. A press for dewatering and compacting aqueous slurries and sludges which comprises a horizontal elongated tubular die having a smooth bore of uniform diameter in which one end is the discharge end and which includes a charge-receiving zone spaced from the ends of the die, a charging inlet above the charge-receiving zone, and a compacting zone between the charge-receiving zone and the discharge end of the die; a solid smooth-surfaced cylindrical pressing ram having a smooth flat end face, which pressing ram passes into the die through the rear end of the die, has a close sliding fit in the die and has a reciprocating stroke from the rear end of the charge-receiving zone to the discharge end of the die; means for reciprocating the pressing ram; a solid cylindrical anvil ram having a smooth flat end face, which anvil ram passes into the die through the discharge end of the die, has a close sliding fit in the die, and has a reciprocating stroke from the front end of the charge-receiving zone to a position outside of the discharge end of the die at a distance greater than the length of the compacted solid mass produced in the compacting zone, a bearing for said anvil ram spaced from the discharge end of the die at a distance slightly greater than the distance between the end face of the ram and the discharge end of the die when the ram is at the outer end of its stroke, said anvil ram having a plurality of small liquid-conducting passages in the form of grooves in its cylindrical surface extending longitudinally from the end of the ram for a distance at least equal to the distance from the compacting zone to the aforesaid bearing for the ram, the smallest dimension of each groove being in the range of from 0.005 to about 0.1 inch and the sum of the cross-sectional areas of such grooves being no greater than about 5% of the cross-sectional area of the ram; means for reciprocating the anvil ram; a vertically reciprocating plunger having its lower end normally positioned over the space immediately outside of the discharge end of the die, means reciprocating said plunger to move the lower end of said plunger downwardly past the discharge end of the die whenever compacted solids have been moved substantially completely out of such die; a solids-receiving chute having its upper end positioned under the space immediately outside of the discharge end of the die, a cover for the upper end of said chute normally maintained in closed position, means moving said cover to uncover the upper end of said chute whenever the anvil ram is moved out of the die; and an enlarged liquid-receiving chamber enclosing the discharge end of the die, the lower end of the plunger, the upper end of the solids-receiving chute, and the aforesaid bearing for the anvil ram.

8. A press for dewatering and compacting aqueous slurries and sludges which comprises a horizontal elongated tubular die having a smooth bore of uniform diameter in which one end is the discharge end and which includes a charge-receiving zone spaced from the ends of the die, a charging inlet above the charge-receiving zone, and a compacting zone between the charge-receiving zone and the discharge end of the die; a solid smooth-surfaced cylindrical pressing ram having a smooth flat end face, which pressing ram passes into the die through the rear end of the die, has a close sliding fit in the die and has a reciprocating stroke from the rear end of the charge-receiving zone to the discharge end of the die; means for reciprocating the pressing ram; a solid cylindrical anvil ram having a smooth flat end face, which anvil ram passes into the die through the discharge end of the die, has a close sliding fit in the die, and has a reciprocating stroke from the front end of the charge-receiving zone to a position outside of the discharge end of the die at a distance greater than the length of the compacted solid mass produced in the compacting zone, a bearing for said anvil ram spaced from the discharge end of the die at a distance slightly greater than the distance between the end face of the ram and the discharge end of the die when the ram is at the outer end of its stroke, said anvil ram having a plurality of small liquid-conducting passages in the form of grooves in its cylindrical surface extending longitudinally from the end of the ram for a distance at least equal to the distance from the charge-receiving zone to the aforesaid bearing for the ram, the smallest dimension of each groove being in the range of from 0.005 to about 0.1 inch and the sum of the cross-sectional areas of such grooves being no greater than 5% of the cross-sectional area of the ram; means for reciprocating the anvil ram; and a plurality of the groove-cleaning tools positioned around the anvil ram adjacent the end of the ram when said ram is at the outer end of its stroke, the ends of said tools projecting into the grooves in the surface of the ram and having a sliding fit therein.

9. A press for dewatering and compacting aqueous slurries and sludges which comprises a horizontal elongated tubular die having a smooth bore of uniform diameter in which one end is the discharge end and which includes a charge-receiving zone spaced from the ends of the die, a charging inlet above the charge-receiving zone, and a compacting zone between the charge-receiving zone and the discharge end of the die; a solid smooth-surfaced cylindrical pressing ram having a smooth flat end face, which pressing ram passes into the die through the rear end of the die, has a close sliding fit in the die and has a reciprocating stroke from the rear end of the charge-receiving zone to the discharge end of the die; means for reciprocating the pressing ram; a solid cylindrical anvil ram having a smooth flat end face, which anvil ram passes into the die through the discharge end of the die, has a close sliding fit in the die, and has a reciprocating stroke from the front end of the charge-receiving zone to a position outside of the discharge end of the die at a distance greater than the length of the compacted solid mass produced in the compacting zone, a bearing for said anvil ram spaced from the discharge end of the die at a distance slightly greater than the distance between the end face of the ram and the discharge end of the die when the ram is at the outer end of its stroke, said anvil ram having a plurality of small liquid-conducting passages in the form of grooves in its cylindrical surface extending longitudinally from the end of the ram for a distance at least equal to the distance from the charge-receiving zone to the aforesaid bearing for the ram, the smallest dimension of each groove being in the range of from 0.005 to about 0.1 inch and the sum of the cross-sectional areas of such grooves being no greater than 5% of the cross-sectional area of the ram; means for reciprocating the anvil ram; and a plurality of groove-cleaning tools, equal in number to the grooves in the anvil ram, positioned around the anvil ram adjacent the end of the ram when said ram is at the outer end of its stroke, each of said tools being in the form of a thin blade the end of which projects into one of said grooves in the anvil ram and has a sliding fit therein.

10. A press for dewatering and compacting aqueous slurries and sludges which comprises a horizontal elongated tubular die having a smooth bore of uniform diameter in which one end is the discharge end and which includes a charge-receiving zone spaced from the ends of the die, a charging inlet above the charge-receiving zone, and a compacting zone between the charge-receiving zone and the discharge end of the die; a solid smooth-surfaced cylindrical pressing ram having a smooth flat end face, which pressing ram passes into the die through the rear end of the die, has a close sliding fit in the die and has a reciprocating stroke from the rear end of the charge-receiving zone to the discharge end of the die; means for reciprocating the pressing ram; a solid cylindrical anvil ram having a smooth flat end face, which anvil ram passes into the die through the discharge end of the die, has a close sliding fit in the die, and has a reciprocating stroke from the front end of the charge-receiving zone to a position outside of the discharge end of the die at a distance greater than the length of the compacted solid mass produced in the compacting zone, a bearing for said anvil ram spaced from the discharge end of the die at a distance slightly greater than the distance between the end face of the ram and the discharge end of the die when the ram is at the outer end of its stroke, said anvil ram having a plurality of small liquid-conducting passages in the form of grooves in its cylindrical surface extending longitudinally from the end of the ram for a distance at least equal to the distance from the charge-receiving zone to the aforesaid bearing for the ram, the smallest dimension of each groove being in the range of from 0.005 to about 0.1 inch and the sum of the cross-sectional areas of such grooves being no greater than 5% of the cross-sectional area of the ram; means for reciprocating the anvil ram; a plurality of groove-cleaning tools positioned around the anvil ram adjacent the end of the ram when said ram is at the outer end of its stroke, the ends of said tools projecting into the grooves in the surface of the ram and having a sliding fit therein; a solids-receiving chute having its upper end positioned under the space immediately outside of the discharge end of the die, a cover for the upper end of said chute normally maintained in closed position, and means moving said cover to uncover the upper end of said chute whenever the anvil ram is moved out of the die; and an enlarged liquid-receiving chamber enclosing the discharge end of the die, the aforesaid bearing for the anvil ram, the groove-cleaning tools, and the upper end of the solids-receiving chute.

11. A press for dewatering and compacting aqueous slurries and sludges which comprises a horizontal elongated tubular die having a smooth bore of uniform diameter in which one end is the discharge end and which includes a charge-receiving zone spaced from the ends of the die, a charging inlet above the charge-receiving zone, and a compacting zone between the charge-receiving zone and the discharge end of the die; a solid smooth-surfaced cylindrical pressing ram having a smooth flat end face, which pressing ram passes into the die through the rear end of the die, has a close sliding fit in the die and has a reciprocating stroke from the rear end of the charge-receiving zone to the discharge end of the die; means for reciprocating the pressing ram; a solid cylindrical anvil ram having a smooth flat end face, which anvil ram passes into the die through the discharge end of the die, has a close sliding fit in the die, and has a reciprocating stroke from the front end of the charge-receiving zone to a position outside of the discharge end of the die at a distance greater than the length of the compacted solid mass produced in the compacting zone, a bearing for said anvil ram spaced from the discharge end of the die at a distance slightly greater than the distance between the end face of the ram and the discharge end of the die when the ram is at the outer end of its stroke, said anvil ram having a plurality of small liquid-conducting passages in the form of grooves in its cylindrical surface extending longitudinally from the end of the ram for a distance at least equal to the distance from the charge-receiving zone to the aforesaid bearing for the ram, the smallest dimension of each groove being in the range of from 0.005 to about 0.1 inch and the sum of the cross-sectional areas of such grooves being no greater than 5% of the cross-sectional area of the ram; means for reciprocating the anvil ram; a plurality of groove-cleaning tools positioned around the anvil ram adjacent the end of the ram when said ram is at the outer end of its stroke, the ends said tools projecting into the grooves in the surface of the ram and having a sliding fit therein; a vertically reciprocating plunger having its lower end normally positioned over the space immediately outside of the discharge end of the die, and means reciprocating said plunger to move the lower end of said plunger downwardly past the discharge end of the die whenever compacted solids have been moved substantially completely out of such die.

12. A press for dewatering and compacting aqueous slurries and sludges which comprises a horizontal elongated tubular die having a smooth bore of uniform diameter in which one end is the discharge end and which includes a charge-receiving zone spaced from the ends of the die, a charging inlet above the charge-receiving zone, and a compacting zone between the charge-receiving zone and the discharge end of the die; a solid smooth-surfaced cylindrical pressing ram having a smooth flat end face, which pressing ram passes into the die through the rear end of the die, has a close sliding fit in the die and has a reciprocating stroke from the rear end of the charge-receiving zone to the discharge end of the die; means for reciprocating the pressing ram; a solid cylindrical anvil ram having a smooth flat end face, which anvil ram passes into the die through the discharge end of the die, has a close sliding fit in the die, and has a reciprocating stroke from the front end of the charge-receiving zone to a position outside of the discharge end of the die at a distance greater than the length of the compacted solid mass produced in the compacting zone, a bearing for said anvil ram spaced from the discharge end of the die at a distance slightly greater than the distance between the end face of the ram and the discharge end of the die when the ram is at the outer end of its stroke, said anvil ram having a plurality of small liquid-conducting passages in the form of grooves in its cylindrical surface extending longitudinally from the end of the ram for a distance at least equal to the distance from the charge-receiving zone to the aforesaid bearing for the ram, the smallest dimension of each groove being in the range of from 0.005 to about 0.1 inch and the sum of the cross-sectional areas of such grooves being no greater than 5% of the cross-sectional area of the ram; means for reciprocating the anvil ram; a plurality of groove-cleaning tools positioned around the anvil ram adjacent the end of the ram when said ram is at the outer end of its stroke, the ends of said tools projecting into the grooves in the surface of the ram and having a sliding fit therein; a vertically reciprocating plunger having its lower end normally positioned over the space immediately outside of the discharge end of the die, and means reciprocating said plunger to move the lower end of said plunger downwardly past the discharge end of the die whenever compacted solids have been moved substantially completely out of such die; a solids-receiving chute having its upper end positioned under the space immediately outside of the discharge end of the die, a cover for the upper end of said chute normally maintained in closed position, and means moving said cover to uncover the upper end of said chute whenever the anvil ram is moved out of the die; and an enlarged liquid-receiving chamber enclosing the discharge end of the die, the aforesaid bearing for the anvil ram, the groove-cleaning tools, the lower end of the plunger, and the upper end of the solids-receiving chute.

References Cited in the file of this patent

UNITED STATES PATENTS

| Number | Name | Date |
|---|---|---|
| 1,149,537 | Phillips | Aug. 10, 1915 |
| 1,158,797 | French | Nov. 2, 1915 |
| 2,618,854 | Lyon | Nov. 25, 1952 |

FOREIGN PATENTS

| Number | Country | Date |
|---|---|---|
| 491,581 | Great Britain | Nov. 30, 1936 |
| 777,965 | France | Dec. 15, 1934 |
| 911,244 | France | Mar. 4, 1946 |